(12) United States Patent
Lien et al.

(10) Patent No.: US 7,836,237 B2
(45) Date of Patent: Nov. 16, 2010

(54) CHANGEABLE CPU MODULE APPARATUS FOR A COMPUTER

(75) Inventors: Jung-Lung Lien, Taipei (TW); Tun-Ming Lee, Taipei (TW); Yueh-Yun Chen, Taipei (TW)

(73) Assignee: First International Computer, Inc., Taipei (TW)

( * ) Notice: Subject to any disclaimer, the term of this patent is extended or adjusted under 35 U.S.C. 154(b) by 127 days.

(21) Appl. No.: 12/232,355

(22) Filed: Sep. 16, 2008

(65) Prior Publication Data

US 2009/0300253 A1    Dec. 3, 2009

(30) Foreign Application Priority Data

Jun. 2, 2008    (TW)    ............................ 97120468 A

(51) Int. Cl.
*H05K 7/10*    (2006.01)
(52) U.S. Cl. ................ 710/301; 710/300; 710/313; 361/679.32; 439/638; 439/945
(58) Field of Classification Search ................ 710/300, 710/301, 313; 361/679.32; 439/65, 79, 76.1, 439/638, 945
See application file for complete search history.

(56) References Cited

U.S. PATENT DOCUMENTS

| | | | | |
|---|---|---|---|---|
| 5,550,710 A | * | 8/1996 | Rahamim et al. | ...... 361/679.41 |
| 5,608,608 A | * | 3/1997 | Flint et al. | ............. 361/679.32 |
| 5,664,118 A | * | 9/1997 | Nishigaki et al. | ........... 710/304 |

(Continued)

FOREIGN PATENT DOCUMENTS

DE        19514646 A1    11/1995

OTHER PUBLICATIONS

Hewlett Packard. CPU Upgrade Manual. Edition 8, 0399. Mar. 1999.*

(Continued)

*Primary Examiner*—Mark Rinehart
*Assistant Examiner*—Matthew D Spittle
(74) *Attorney, Agent, or Firm*—Bacon & Thomas, PLLC

(57) ABSTRACT

The invention relates to a changeable central processing unit (CPU) module apparatus for a computer, comprising a system control module board, a CPU module board and a heat-dissipating device. A second bus connector of the CPU module board is a golden finger plug extending from the CPU module board and is installed on a socket plug of a first bus connector of the system control module board. With the invention, a user can reduce the cost of updating the CPU and increase the period of using a peripheral equipment of the computer.

18 Claims, 5 Drawing Sheets

U.S. PATENT DOCUMENTS

| | | | |
|---|---|---|---|
| 5,748,912 A | 5/1998 | Lee | |
| 6,216,185 B1* | 4/2001 | Chu | 710/303 |
| 6,287,129 B1* | 9/2001 | Kuo | 439/79 |
| 6,483,697 B1* | 11/2002 | Jenks et al. | 361/679.3 |
| 6,600,346 B1* | 7/2003 | Macaluso | 327/108 |
| 6,648,695 B1* | 11/2003 | Wu | 439/638 |
| 6,718,415 B1* | 4/2004 | Chu | 710/301 |
| 6,888,523 B2* | 5/2005 | Yamaguchi | 345/87 |
| 7,059,913 B1* | 6/2006 | Chen | 439/638 |
| 7,099,981 B2* | 8/2006 | Chu | 710/301 |
| 7,146,446 B2* | 12/2006 | Chu | 710/301 |
| 7,328,297 B2* | 2/2008 | Chu | 710/301 |
| 7,363,415 B2* | 4/2008 | Chu | 710/313 |
| 7,363,416 B2* | 4/2008 | Chu | 710/313 |
| 7,376,779 B2* | 5/2008 | Chu | 710/313 |
| 7,466,668 B2* | 12/2008 | Dove | 370/293 |
| 7,676,624 B2* | 3/2010 | Chu | 710/313 |
| 2006/0069458 A1* | 3/2006 | Lee et al. | 700/94 |

OTHER PUBLICATIONS iEi Technology Corp. Rocky-3786EV. User Manual. Rev. 4.10. Sep. 25, 2009.*
iEi Technology Corp. WSB-9152. User Manual. Rev. 1.0. Mar. 2006.*
AAEON Technology Inc. SBC-455. Manual. 4th edition. Jul. 1997.*
TYAN Computer Corporation. Quad CPU Card. M4985. Revision 1.00. 2006.*

* cited by examiner

CHANGEABLE CPU MODULE APPARATUS FOR A COMPUTER

BACKGROUND OF THE INVENTION

1. Field of the Invention

The invention relates to a changeable central processing unit (CPU) module apparatus, in particular to a changeable central processing unit (CPU) module apparatus for a computer.

2. Background of the Invention

Conventionally, when designing a computer with respect to CPUs of different specifications, due to difference in the number and definition of pins of a CPU, a matching motherboard should be installed in such as a notebook computer. Such a design will result in that a notebook computer manufacturer should provide a dedicated motherboard with respect to each CPU having a different specification so as to produce notebook computers having different CPU's processing ability. Since there is a huge number of the CPUs in different specifications, the above-mentioned design will render notebook computer manufacturers to store a huge number of motherboards in different kinds, resulting in inconvenience in production and increase in cost.

In addition, if a user wishes to up-grade a notebook computer after using the notebook computer a certain time, such as adopting a higher grade CPU, due to that a CPU with a different specification corresponds to a different motherboard, such a upgrade render the user to replace the motherboard of the whole notebook computer, resulting in waste of resources. Thus, the design of the conventional notebook computers has many defects which need to be overcome.

SUMMARY OF THE INVENTION

The invention is mainly intended to provide a changeable CPU module apparatus for a computer, comprising a system control module board and a CPU module board having a power connector. It is provided on the system control module board a keyboard controller, an input/output controller, a power controller, a video/audio controller, a universal serial bus and a first bus connector, the first bus connector being connected to the keyboard controller, the input/output controller, the power controller, the video/audio controller, and the universal serial bus (USB), and it is provided on the CPU module board a south/north bridging device, a CPU, a dynamic memory, a basic input/output system (BIOS) and a second bus connector, the south/north bridging device being connected to the CPU, the dynamic memory and the second bus connector, the power connector being connected to an external power source to provide power to the south/north bridging device, the CPU, the dynamic memory and the basic input/output system (BIOS), wherein the first bus connector matches the second bus connector and the first bus connector is connected to the second bus connector such that it is easy to replace the CPU, in particular in a notebook computer, thereby satisfying the user to upgrade the notebook computer, and reducing the additional cost for the user to replace the CPU and increasing the period of using a peripheral equipment.

DETAILED DESCRIPTION OF THE PREFERRED EMBODIMENT

Figure 1A:
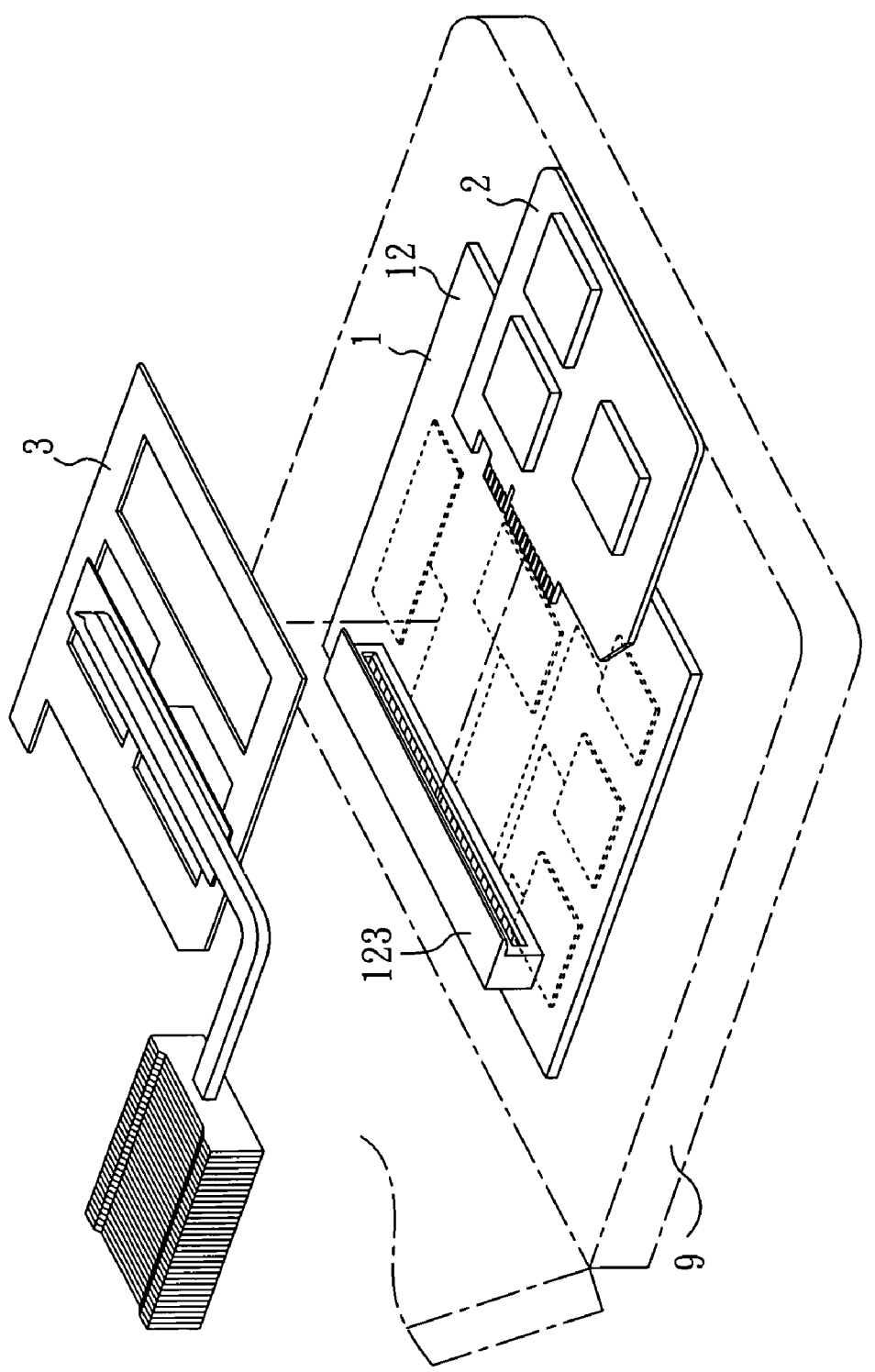
FIG. 1(A) is an appearance diagram of the invention.

The invention relates to a changeable central processing unit (CPU) module apparatus for a computer. As shown in the appearance diagram of the invention in FIG. 1(A), the apparatus comprises a system control module board 1, a CPU module board 2 and a heat-dissipating device 3. Accompanied by referring to FIG. 1(B), the system control module board 1, the CPU module board 2 and the heat-dissipating device 3 overlap one another in order within a notebook computer case 9.

Figure 2:
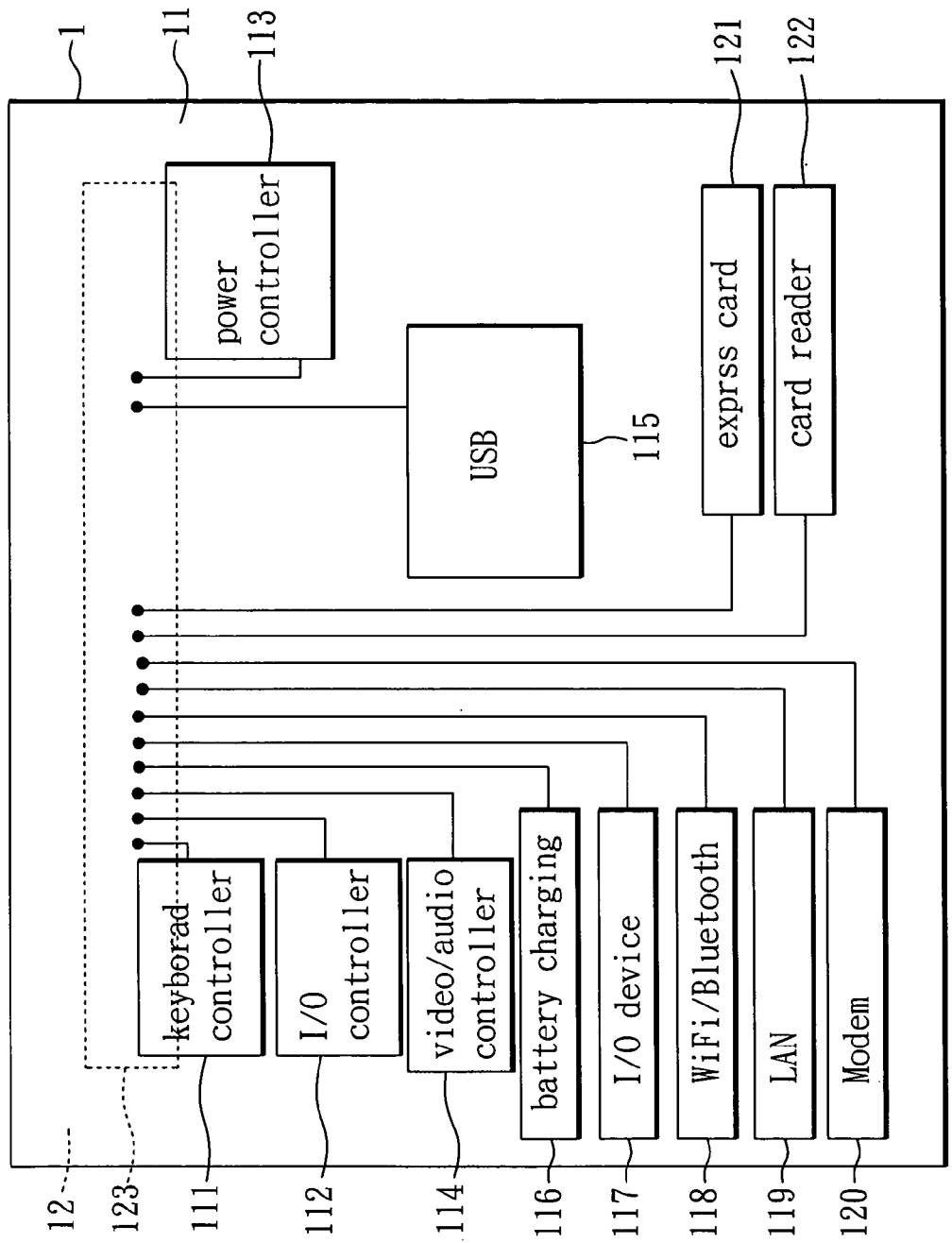
FIG. 2 is a schematic diagram of a system control module board of the invention.

As shown in the schematic diagram of the system control module board 1 of the invention in FIG. 2, the system control module board 1 includes a first surface 11 and a second surface 12 opposite to the first surface 11. It is provided on the first surface 11 of the system control module board 1 a keyboard controller 111, an input/output controller 112, a power controller 113, a video/audio controller 114, a USB 115, a battery charging device 116, a plurality of input/output devices 117, a WiFi/bluetooth device 118, a local area network 119, a modem 120, a express card 121 and a card reader 122. It is provided on the second surface 12 of the system control module board 1 a first bus connector 123, which is connected to the keyboard controller 111, the input/output controller 112, the power controller 113, the video/audio controller 114, the USB 115, the battery charging device 116, the plurality of input/output devices 117, the WiFi/bluetooth device 118, the local area network 119, the modem 120, the express card 121 and the card reader 122. The first bus connector 123 is a socket plug with its insertion direction in parallel with the second surface 12.

Figure 3:
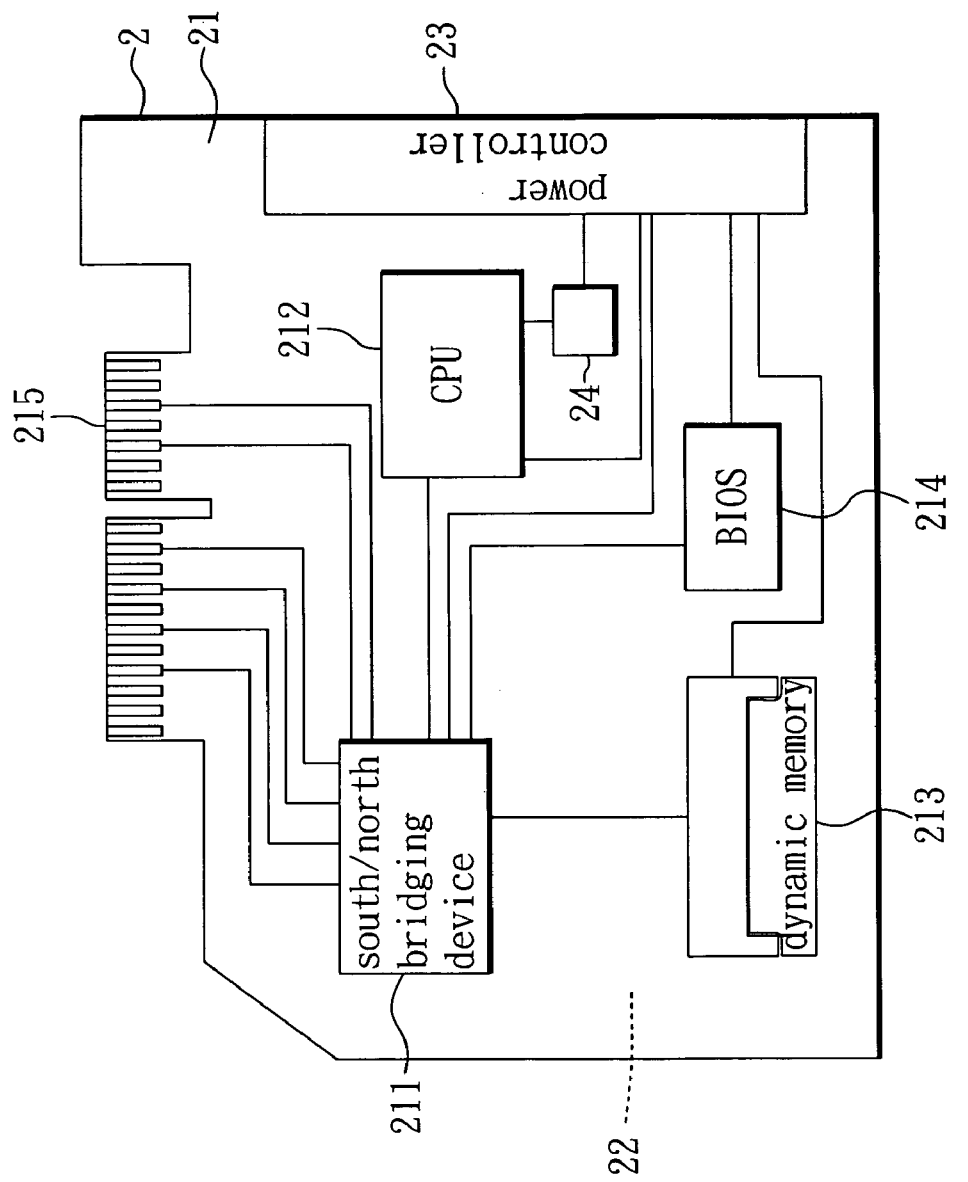
FIG. 3 is a schematic diagram of a CPU module board of the invention.

FIG. 3 is a schematic diagram of the CPU module board 2 of the invention. The CPU module board 2 includes a first surface 21, a second surface 22 opposite to the first surface 21, and a power connector 23. It is provided on the first surface 21 of the CPU module board 2 a south/north bridging device 211, a CPU 212, a dynamic memory 213, a basic input/output system (BIOS) 214, a thermal sensor 24 and a second bus connector 215. The thermal sensor 24 is connected to the CPU 212 for inspecting the temperature of the CPU 212. The south/north bridging device 211 is connected to the CPU 212, the dynamic memory 213, the basic input/output system (BIOS) 214 and the second bus connector 215. The power connector 23 is connected to an external power source to provide power to the south/north bridging device 211, the CPU 212, the dynamic memory 213, the basic input/output system (BIOS) 214 and the thermal sensor 24. The second bus connector 215 of the CPU module board 2 is a golden finger plug extending from the CPU module board 2.

Figure 1B:
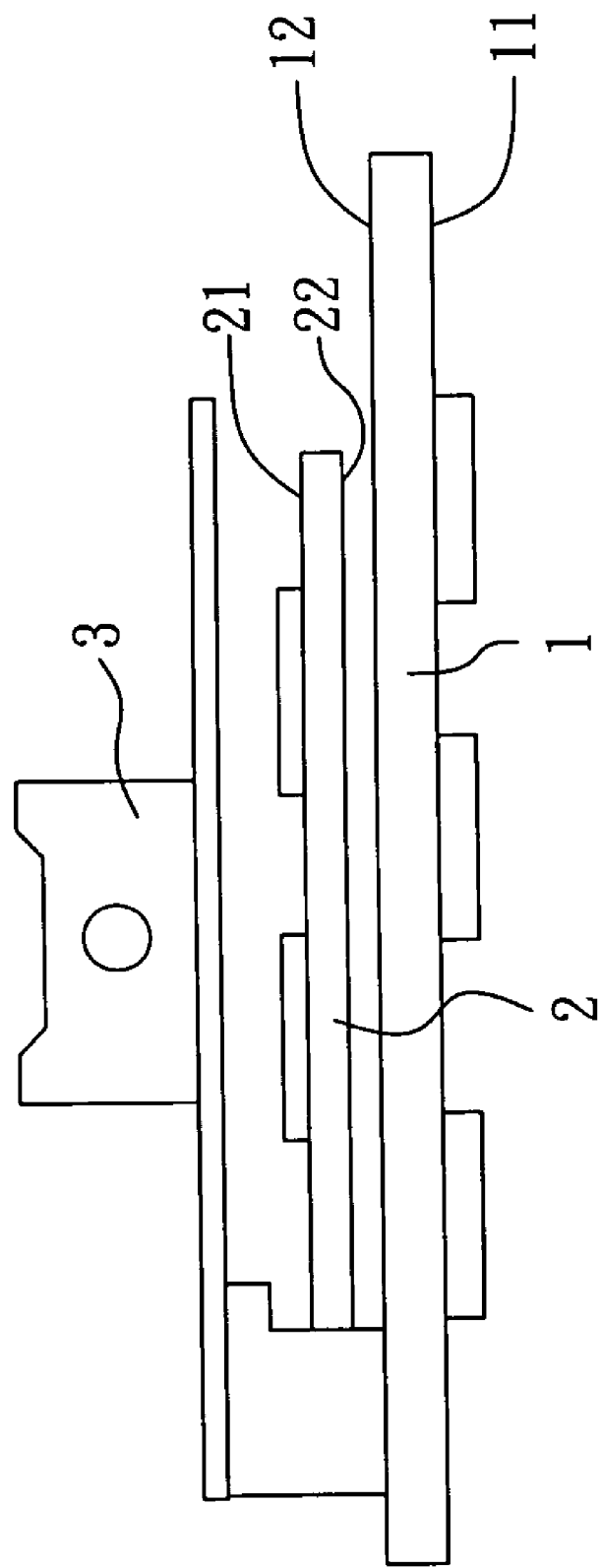
FIG. 1(B) is a schematic diagram of the invention.

The first bus connector 123 of the system control module board 1 matches the second bus connector 215 of the CPU module board 2 such that through inserting the second bus connector 215 having the golden finger form into the first bus connector 123 having the socket form, the CPU module board 2 and the system control module board 1 are assembled into the motherboard of a desktop computer and/or a notebook computer. And, when the first bus connector 123 is connected to the second bus connector 215, as shown in FIG. 1(B), the second surface 22 of the CPU module board 2, not providing electronic elements, faces the second surface 12 of the system control module board 1, not providing electronic elements, and overlaps thereon. Therefore, the CPU module board 2 and the system control module board 1 can be intimately overlapped together due to no electronic elements provided therebetween. Thus, the thickness of the desktop computer and/or the notebook computer can be effectively reduced. In addition, on the CPU module board 2, the operation of the CPU 212 will generate heat. To overcome the problem of the operation of the CPU 212 resulting from the heat, a heat-dissipating device 3 is adopted to be overlapped on the CPU 212 so as to dissipate the heat generated during the operation of the CPU 212. The heat-dissipating device 3 may be a heat-conducting metal or a compact fan capable of removing the heat from the CPU 212.

Furthermore, the first bus connector 123 may be placed at a side of the system control module board 1 and the second bus connector 215 may be placed at a side of the CPU module board 2 such that the system control module board 1 and the CPU module board 2 may be placed together side by side. In the above configuration method, the first bus connector 123 may also be placed on the first surface 11 or the second surface 12 of the system control module board 1, and the second bus connector 215 may also be placed on the first surface 21 or the second surface 22 of the CPU module board 2. That is, the way of assembling or arranging the system control module board 1 and the CPU module board 2 may be conducted alternatively by people having common knowledge in the art.

Figure 4:
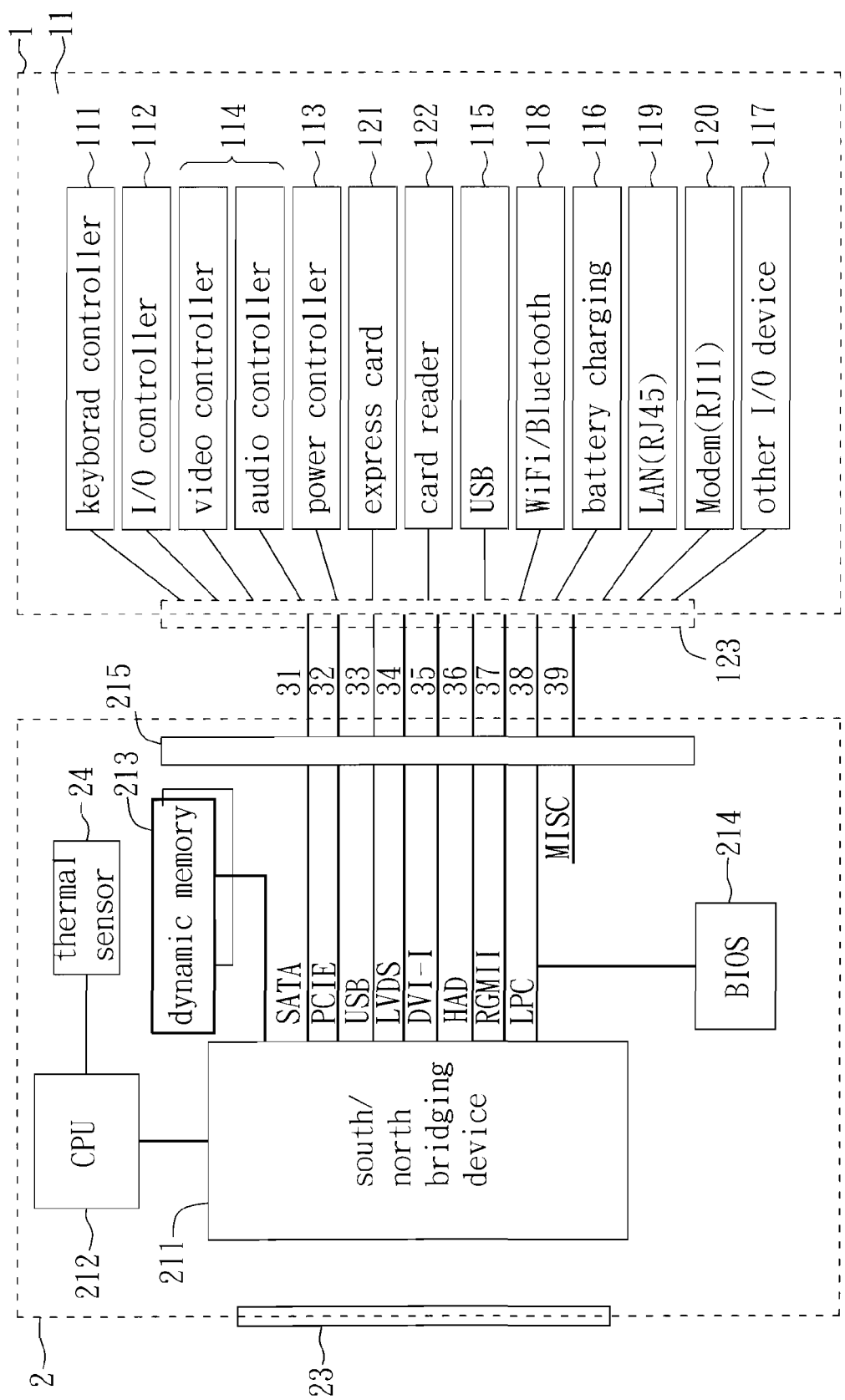
FIG. 4 is a block diagram of the invention.

FIG. 4 is a block connection diagram of the system control module board 1 and the CPU module board 2 of the invention. Inside it, the matched first bus connector 123 and the second bus connector 215 have a plurality of connecting pins, including a plurality of connecting pins 31 for SATA port, a plurality of connecting pins 32 for PCIE (Peripheral Component Interconnect Express) X1, a plurality of connecting pins 33 for USB, a connecting pin 34 for low voltage differential signaling (LVDS), a connecting pin 35 for DVI-I (Digital Visual Interface-Integrated), a connecting pin 36 for HAD (High Definition Audio), a plurality of connecting pins 38 for LPC (Low Pin Count), a connecting pin 39 for MISC and GPIO (General Purpose I/O) and a connecting pin 37 for RGMII (Reduced Gigabit Media Independent Interface). The plurality of connecting pins 31 for the SATA port is to provide the system control module board 1 and the CPU module board 2 for proceeding access of a hard disk and a CD. The plurality of connecting pins 32 for the PCIE X1 is to provide the system control module board 1 and the CPU module board 2 for proceeding with the use of the wireless network and the express card. The plurality of connecting pins 33 for the USB is to provide the system control module board 1 and the CPU module board 2 for proceeding with the use of the a network camera, a express card, a wireless network, a bluetooth device system and a card reader. The connecting pin 34 for the LVDS is to provide the system control module board 1 and the CPU module board 2 for proceeding with the use of an LCD display. The connecting pin 35 for the DVI-I is to provide the system control module board 1 and the CPU module board 2 for proceeding with the use of a DVI display. The connecting pin 36 for the HAD is to provide the system control module board 1 and the CPU module board 2 for proceeding with the use of the HAD for audio codec. The plurality of connecting pins 38 for the LPC is to provide the system control module board 1 and the CPU module board 2 for proceeding with the use of the BIOS and ASIC (Application Specific Integrated Circuit). The connecting pin 39 for the MISC and GPIO is to provide the system control module board 1 and the CPU module board 2 for proceeding with the use of a control signal. The connecting pin 37 for the RGMII is to provide the system control module board 1 and the CPU module board 2 for proceeding with the use of an LAN MAC/LAN Phy Controller. The above-mentioned connecting pins transfer signals from the south/north bridging device 211 to the system control module board 1 to control the operation of electronic elements on the system control module board 1.

Using the above architecture of the invention, a manufacturer of a desktop computer and/or a notebook computer can use the same system control module board with respect to any kind of the CPU to produce desktop computers and/or notebook computers having different CPU's processing ability. When a user wishes to upgrade a desktop computer and/or a notebook computer, he may only need to replace the CPU module board 2 of the desktop computer and/or the notebook computer according to his requirement without simultaneously changing the whole motherboard of the desktop computer and/or the notebook computer. Therefore, the use period of the desktop computer and/or the notebook computer can be effectively extended and the cost of replacing the CPU by the user can be reduced.

The above embodiments are exampled merely for convenience of interpretation. The scope of what is claimed by the invention should be based on what is recited in the claims but not merely limited to the above embodiments.

What is claimed is:

1. A changeable central processing unit (CPU) module apparatus for a notebook computer, comprising:

a system control module board, including a keyboard controller, an input/output controller, a power controller, a video/audio controller, a universal serial bus (USB) and a first bus connector, the first bus connector being connected to the keyboard controller, the input/output controller, the power controller, the video/audio controller, and the USB; and a CPU module board, including a power connector, a south/north bridging device, a CPU, a dynamic memory, a basic input/output system (BIOS) and a second bus connector, the south/north bridging device being connected to the CPU, the dynamic memory and the second bus connector, the power connector being connected to an external power source to provide power to the south/north bridging device, the CPU, the dynamic memory and basic input/output system (BIOS);

wherein the first bus connector matches the second bus connector and the first bus connector is connected to the second bus connector, wherein the system control module board includes a first surface and a second surface opposite to the first surface, the keyboard controller, the input/output controller, the power controller, the video/audio controller and the USB are provided on the first surface of the system control module board, and the first bus connector is provided on the second surface of the system control module board; and wherein the CPU module board includes a first surface and a second surface opposite to the first surface, the south/north bridging device, the CPU, the dynamic memory and the basic input/output system (BIOS) are provided on the first surface of the CPU module board, the second bus connector extends from the CPU module board, such that when the first bus connector is connected to the second bus connector, the second surface of the CPU module board faces the second surface of the system control module board and overlaps thereon.

2. The changeable CPU module apparatus for a computer as claimed in claim 1, wherein the second bus connector is a golden finger plug extending from the CPU module board and the first bus connector is a socket plug vertically installed on the system control module board.

3. The changeable CPU module apparatus for a computer as claimed in claim 1, further comprising a heat-dissipating device, overlapping on the upper surface of the CPU module board to dissipate the heat generated during operation of the CPU.

4. The changeable CPU module apparatus for a computer as claimed in claim 1, wherein the system control module board further comprises a battery charging device and a plurality of input/output devices.

5. The changeable CPU module apparatus for a computer as claimed in claim 1, wherein the system control module board further comprises a WiFi/Bluetooth device, a local area network and a modem.

6. The changeable CPU module apparatus for a computer as claimed in claim 1, wherein the system control module board further comprises a express card and a card reader.

7. The changeable CPU module apparatus for a computer as claimed in claim 1, wherein the CPU module board further comprises a thermal sensor.

8. The changeable CPU module apparatus for a computer as claimed in claim 1, wherein the south/north bridging device transfers a corresponding signal to the system control module board through connection of the first and second bus connectors.

9. The changeable CPU module apparatus for a computer as claimed in claim 1, wherein the first and second bus connectors include a plurality of connecting pins of SATA ports to provide the CPU module board and the system control module board for accessing a hard disk and a CD.

10. The changeable CPU module apparatus for a computer as claimed in claim 1, wherein the first and second bus connectors include a plurality of connecting pins of PCIE X1's to provide the CPU module board and the system control module board for using a wireless network and a express card.

11. The changeable CPU module apparatus for a computer as claimed in claim 1, wherein the first and second bus connectors include a plurality of connecting pins of USB's to provide the CPU module board and the system control module board for using a network camera, a express card, a wireless network, a bluetooth device and a card reader.

12. The changeable CPU module apparatus for a computer as claimed in claim 1, wherein the first and second bus connectors include a connecting pin for a low voltage differential signaling to provide the CPU module board and the system control module board for using an LCD display.

13. The changeable CPU module apparatus for a computer as claimed in claim 1, wherein the first and second bus connectors include a connecting pin for a digital visual interface-integrated (DVI-I) to provide the CPU module board and the system control module board for using a DVI display.

14. The changeable CPU module apparatus for a computer as claimed in claim 1, wherein the first and second bus connectors include a connecting pin for a HAD to provide the CPU module board and the system control module board for using audio coding and decoding of the HAD.

15. The changeable CPU module apparatus for a computer as claimed in claim 1, wherein the first and second bus connectors include a plurality of connecting pins for a Low Pin Count (LPC) to provide the CPU module board and the system control module board for using a basic input/output system and an application specific IC.

16. The changeable CPU module apparatus for a computer as claimed in claim 1, wherein the first and second bus connectors include a connecting pin for an MISC and GPIO to provide the CPU module board and the system control module board for using a control signal.

17. The changeable CPU module apparatus for a computer as claimed in claim 1, wherein the first and second bus connectors include a connecting pin for an RGMII to provide the CPU module board and the system control module board for using an LAN MAC/LAN Phy Controller.

18. A changeable central processing unit (CPU) module apparatus for a notebook computer, comprising a system control module board having a first surface having formed thereon a keyboard controller, an input/output controller, a power controller, a video/audio controller and a universal serial bus, and a second surface having formed thereon a first bus connector connected to the keyboard controller, the input/output controller, the power controller, the video/audio controller and the universal serial bus (USB), the first surface being opposite to the second surface; characterized by:
a CPU module board, being independently installed and including a first surface formed thereon a power connector, a south/north bridging device, a CPU, a dynamic memory and a basic input/output system (BIOS) a second surface opposite to the first surface, and a second bus connector extending from the CPU module board, the south/north bridging device being connected to the CPU, the dynamic memory and the second bus connector, the power connector being connected to an external power source to provide power to the south/north bridging device, the CPU, the dynamic memory and the basic input/output system (BIOS), the second bus connector of the CPU module board matching the first bus connector of the system control module board and the second bus connector of the CPU module board being connected to the first bus connector of the system control module board, wherein, when the first bus connector is connected to the second bus connector, the second surface of the CPU module board faces the second surface of the system control module board and overlaps thereon.

* * * * *